United States Patent [19]

Hibino

[11] Patent Number: 5,040,086
[45] Date of Patent: Aug. 13, 1991

[54] POSITIONING MECHANISM FOR A HEAD OF A MAGNETIC DISK DRIVE

[75] Inventor: Atsuo Hibino, Amagasaki, Japan

[73] Assignee: Mitsubishi Denki Kabushiki Kaisha, Tokyo, Japan

[21] Appl. No.: 429,694

[22] Filed: Oct. 31, 1989

[30] Foreign Application Priority Data

Dec. 7, 1988 [JP] Japan .................................. 63-310319
Apr. 21, 1989 [JP] Japan .................................. 1-102708

[51] Int. Cl.⁵ ........................ G11B 21/16; G11B 33/14
[52] U.S. Cl. ................................... 360/104; 360/97.02
[58] Field of Search ............................... 360/103–105, 360/97.02

[56] References Cited

U.S. PATENT DOCUMENTS 4,387,409 6/1983 Otavsky et al. ..................... 360/104
4,549,239 10/1985 Kawajiri ......................... 360/104 X
4,689,703 8/1987 Olbrich et al. ..................... 360/104

OTHER PUBLICATIONS

Japanese Patent Application Laid-Open No. 63-866, Laid Open Date: Jan. 5, 1988.
Japanese Patent Application Laid-Open No. 62-57178, Laid Open Date: Mar. 12, 1987.
"Finding the Stress Hidden in Parts" Machine Design, Nov. 20, 1968, pp. 124–131.

Primary Examiner—John H. Wolff
Attorney, Agent, or Firm—Wolf, Greenfield & Sacks

[57] ABSTRACT

A magnetic disc apparatus, wherein head holders for supporting a data head are fixed to a carriage by a plurality of fixing members, and the respective linear expansion coefficients of head holders, carriage and a plurality of fixing members are equal.

In addition, a magnetic disc apparatus, wherein head holders for supporting a data head are fixed to a carriage by a plurality of fixing members, and the respective stresses generated therein, in the range of using temperature of the head holders, carriage and fixing members, are within respective stress-strain proportional limits or less than respective proof stresses.

6 Claims, 3 Drawing Sheets

POSITIONING MECHANISM FOR A HEAD OF A MAGNETIC DISK DRIVE

BACKGROUND OF THE INVENTION

1. Field of the Invention

The present invention relates to a magnetic disc apparatus, particularly to an improvement of a fixed portion of a head holder thereof.

2. Description of Related Art

FIG. 1 is a perspective view showing a schematic construction of a fixed portion of a head holder of a magnetic disc apparatus similar to the one disclosed in, for example, Japanese Patent Application Laid-Open No. 63-866 (1988).

In this FIG., 1A and 1B designate magnetic discs, 2 servo information written in the upper surface of the magnetic disc 1A, and 3 a servo head provided at the upper surface of the magnetic disc 1A to read the servo information written therein.

Reference numeral 4 designates a data head provided at a lower surface of the magnetic disc 1A, writing information to and reading information from the magnetic disc 1A. In addition, only one data head 4 is shown in the figure, however, it is also provided at the magnetic disc 1B.

Symbols 5A, 5B and 5C designate head holders to support the servo head 3 or the data head 4, 5A for the servo head 3, 5B for the data head 4, and 5C for the other data head not shown.

Numeral 6 designates a carriage, 7 a screw being a fixing member for fixing the aforesaid respective head holders to the carriage, thereby, respective head holders 5A, 5B and 5C are stacked and fixed to the carriage 6.

In such a construction, the magnetic discs 1A and 1B rotate at a constant speed, thereby information is written to and read from it through the data head 4 fixed to the head holders 5B and 5C.

By obtaining information of position by means of the servo information 2 read by the servo head 3 which is written in the upper surface of one magnetic disc 1A, closed-loop control system (not shown) for positioning is operated to rotate the carriage 6 for controlling the position of the servo head.

Since the servo head 3 and the data head 4 are fixed to the carriage 6 through the head holders 5A, 5B and 5C, and they are respectively held along a line parallel with the axis of rotation of the magnetic discs 1A and 1B, the data head 4 is also positioned properly when the servo head 3 is positioned as above.

The magnetic disc apparatus is thus constructed, and the head holders 5A, 5B and 5C are fixed to the carriage 6 by screws 7, 7, 7. FIG. 3 depicts an exploded view of this construction. The head holders 5A and 5B have respectively three through holes for the screws 7, 7, 7, and the head holder 5C has two through holes and a center screw hole. The three head holders 5A, 5B, 5C are combined with the center screw 7 and the combined holders are fixed to the carriage 6 with the other two screws 7, 7. Howver, in the case where only one screw is used, there is a problem in that the head holders 5A, 5B and 5C can easily vibrate. In the case where a plurality of screws are used but linear expansion coefficients are different between the head holders 5A, 5B and 5C and the carriage 6, there is also a problem in that the head holders 5A, 5B and 5C deform due to bimetal effect responsive to temperature change.

In addition, in an article from the January 1986 issue of "Machine Design", for example, reports that in the case where the linear expansion coefficient of the head holders 5A, 5B and 5C is larger than that of the screws 7, 7, 7 compressive load from the screws 7, 7, 7 against the head holders is increased as the temperature rises. Compressive load more than the stress-strain proportional limit or more than proof stress of the head holders 5A, 5B and 5C is loaded on the head holders 5A, 5B and 5C. Permanent deformation occurs even though the temperature becomes normal, and the head holders 5A, 5B and 5C are released from the compressive load. On the contrary, when temperature is lowered, axial tension of the screws are reduced, thereby, the head holders 5A, 5B and 5C easily vibrate.

When thermal deformation occurs in the head holders, and there are variations in thermal deformation, the servo head 3 and all the data head 4 are not positioned along the line parallel with the axis of rotation of the magnetic discs 1A and 1B. Therefore, the data head 4 deviates even if the servo head 3 is positioned to cause a problem that signals are not written and read properly. In addition, vibration of the head holders 5A, 5B and 5C adversely affects closed-loop control for positioning, thereby, positioning without stabilization results in the data head also deviating, whereby signals not being written and read properly.

SUMMARY OF THE INVENTION

The present invention has been devised to solve the problem above mentioned.

The primary object of the present invention is to provide a magnetic disc apparatus for positioning the data head properly by preventing the head holder from thermal deformation and vibration.

The above and further objects and features of the invention will more fully be apparent from the following detailed description with accompanying drawings.

DESCRIPTION OF THE PREFERRED EMBODIMENTS

In the following, explanation will be given on one embodiment of the invention referring to FIG. 1.

Figure 1:
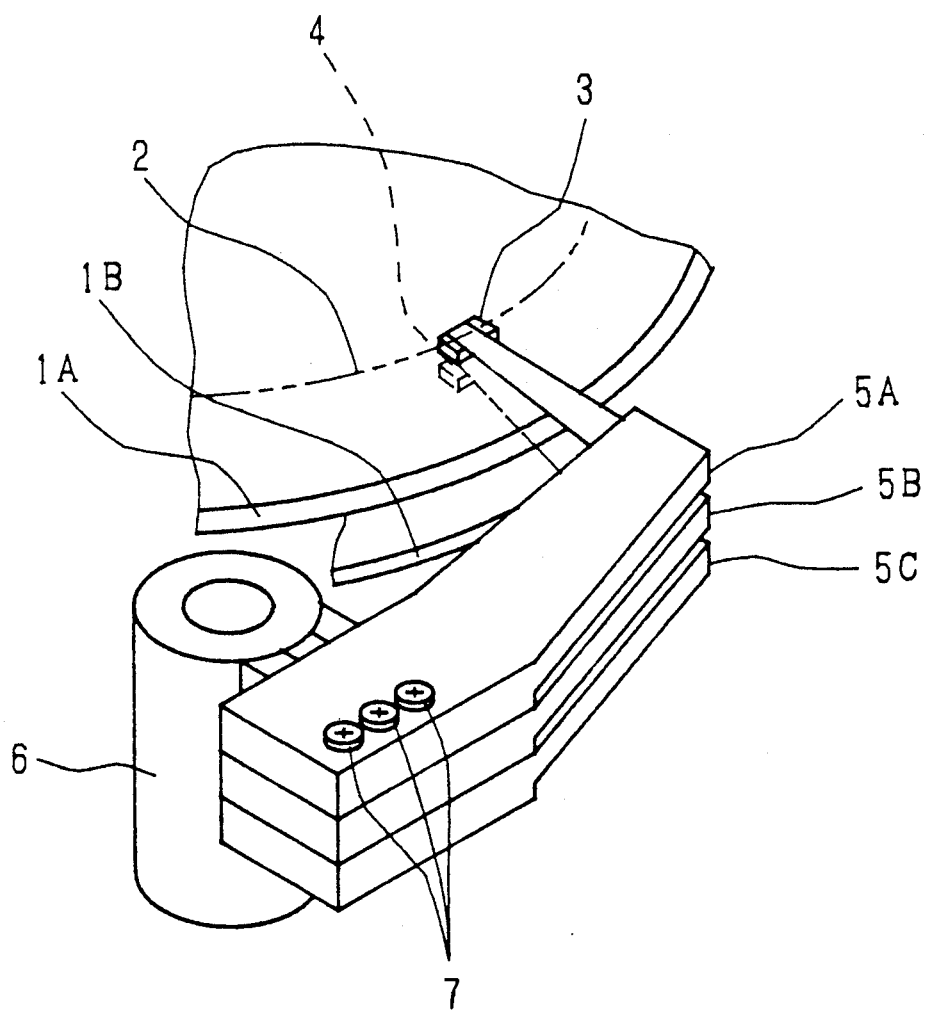
FIG. 1 is a perspective view showing the main construction of a magnetic disc apparatus of the present invention.
Figure 3:
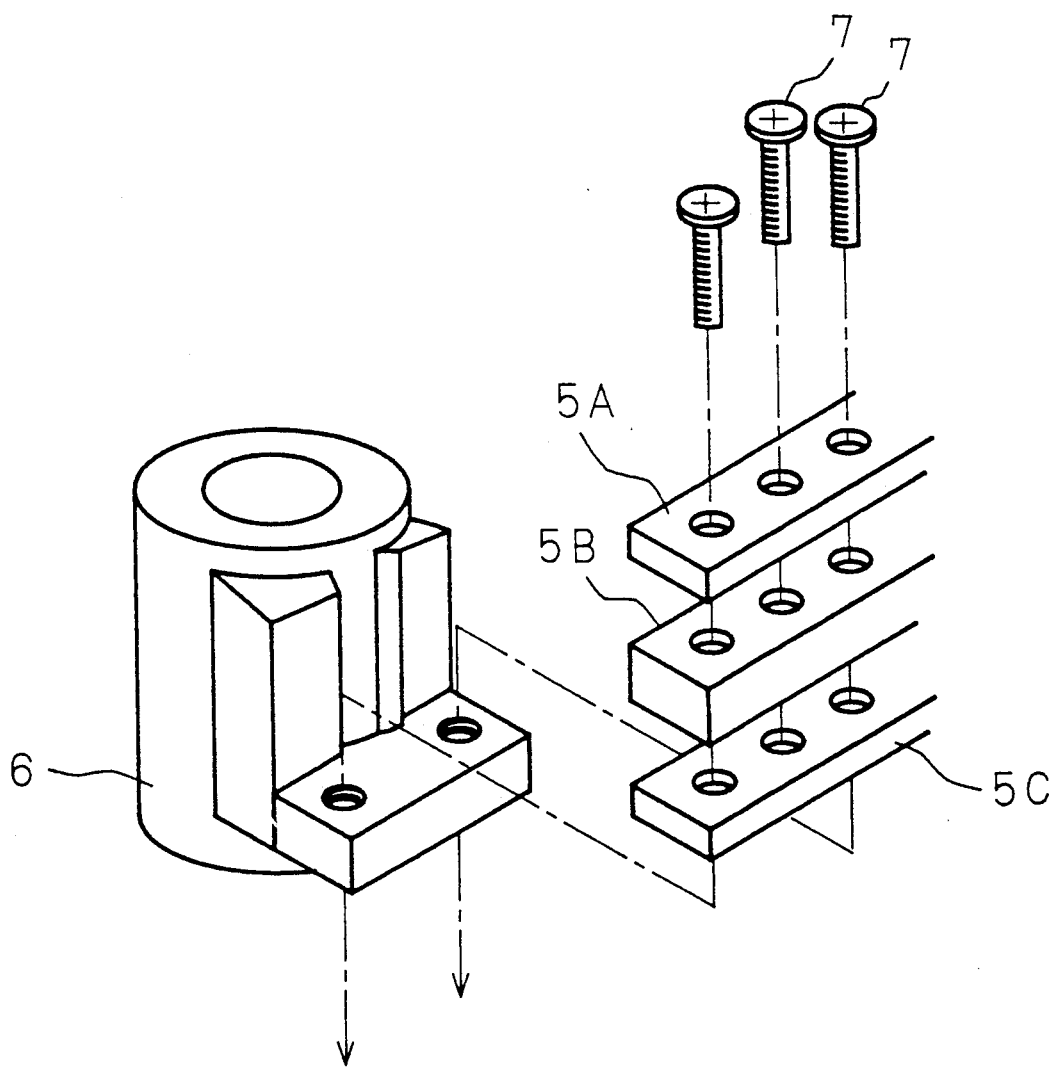
FIG. 3 is an exploded perspective view showing the main construction of a magnetic disk apparatus of the present invention.

FIG. 1, as described before, is a perspective view showing a schematic construction of a magnetic disc apparatus. Three screws 7, 7, 7, fixing members for fixing head holders 5A, 5B and 5C to the carriage 6, are provided. FIG. 3, as described before depicts an exploded view of this construction. The head holders 5A and 5B have respectively three through holes for the screws, and the head holder 5C has two through holes and a center screw hole. The three head holders 5A, 5B and 5C are combined with the center screw 7 and the combined holders are fixed to the carriage 6 with the other two screws 7. Materials of respective head holders 5A, 5B and 5C, carriage 6, and screws 7, 7, 7 have equal linear expansion coefficients.

By constructing as above, even if expansion and contraction occurs due to temperature change, the respective ratios of expansion and contraction are equal, so that there occurs no relative change and bimetal effect. Therefore there is no possibility that the compressive load from screws 7, 7, 7 against the head holders 5A, 5B and 5C increases to deform the head holders 5A, 5B, 5C, and that the axial force of the screws 7, 7, 7 reduces to create looseness. In addition, the head holders 5A, 5B and 5C and the carriage 6 being fixed by a plurality of screws 7, 7, 7, isolates them from vibration more effectively.

Figure 2:
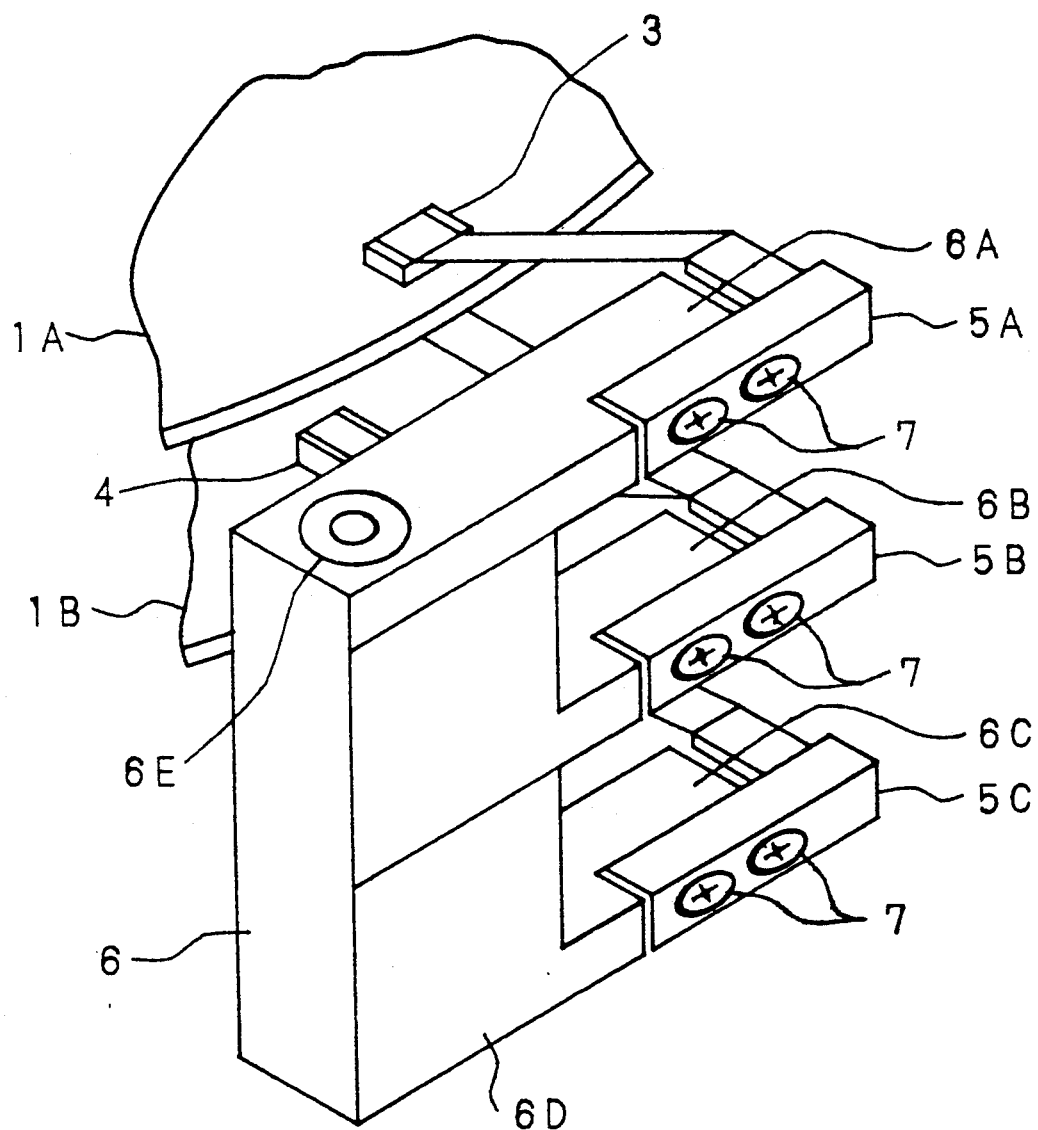
FIG. 2 is a perspective view showing a construction of an alternative preferred embodiment of this invention.

FIG. 2 shows another embodiment of this invention. In this embodiment, a carriage 6 is composed of a base part 6D with a shaft 6E, and E-shaped 3 holding parts 6A, 6B, 6C projecting from the base part 6D, where respective head holders 5A, 5B, 5C are fixed by 2 screws 7, 7 thereto, wherein axial direction of each screw coincides with or approximately coincide with radial direction of the magnetic discs 1A, 1B. Other construction is the same as that of the embodiment shown in FIG. 1. From this embodiment, the same effect can also be obtained.

In addition, the explanation as above has shown the embodiment wherein the servo head 3 and the data head 4 are positioned by rotation of the carriage 6, however, the same effect can be obtained by the carriage 6 moving linearly to position the servo head 3 and the data head 4.

And the embodiment has shown the servo head 3 being provided on the upper surface of the magnetic disc at the most upper part, however, it may be provided at optional surface of the optical disc.

Again, the embodiment has shown, however, the servo head 3 and the data head 4 being positioned by means of the servo head 3 reading out the servo information 2 written in the upper surface of the magnetic disc 1A, thereby closed-loop control being executed, in the case where the data head 4 reads out the servo information 2, thereby closed-loop control being executed to position the data head 4, or thereby open-control being executed to position the data head 4, the same effect can be obtained. And again, the aforementioned embodiment has shown the case wherein all of the linear expansion coefficients of the head holders 5A, 5B and 5C, the carriage 6, the screws 7, 7, 7 are equal, however, the same effect can be obtained by combining the head holders 5A, 5B and 5C, the carriage 6 and the screws 7, 7, 7 wherein the respective stresses generated therein, in the range of working temperature, and in the state of the head holders 5A, 5B and 5C being fixed to the carriage 6 with the screws 7, 7, 7, are within respective stress-strain proportional limits or less than respective proof stresses. Although, the embodiment has been shown, wherein the head holders 5A, 5B and 5C are fixed to the carriage 6 with the screws 7, 7, 7, the same effect can be obtained by using pin-like fixing members.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A magnetic disk apparatus comprising:
   a data head for writing information to and reading information from a magnetic disk;
   a servo head for reading and writing position information from and to said magnetic disk;
   head holders for supporting said data head and servo head constructed of a first material having a first linear coefficient of expansion; and
   a carriage for carrying said head holders constructed of a second material having a second linear coefficient of expansion which is substantially equal to said first linear coefficient of expansion;
   a plurality of fixing members for securing together the head holders and carriage, said fixing members constructed of a third material having a third linear coefficient of expansion which is substantially equal to said first linear coefficient of expansion;
   wherein the matching of said first, second and third linear coefficients of expansion of respective head holders, carriage and fixing members reduces stresses generated therebetween, and wherein the fixing members comprise screwing means.

2. A magnetic disc apparatus as set forth in claim 1 wherein the axis of said screwing means is approximately in parallel with the plane of a magnetic disc.

3. A magnetic disc apparatus as set forth in claim 1 wherein the axis of said screwing means is approximately perpendicular to the plane of a magnetic disc.

4. A magnetic disk apparatus comprising:
   a data head for writing information to and reading information from a magnetic disk;
   a head holder for supporting said data head constructed of a first material having a first linear coefficient of expansion;
   a carriage for carrying said head holders constructed of a second material having a second linear coefficient of expansion which is substantially equal to said first linear coefficient of expansion;
   a plurality of fixing members for securing together the head holders and carriage, said fixing members constructed of a third material having a third linear coefficient of expansion which is substantially equal to said first linear coefficient of expansion;
   wherein the matching of said first, second and third linear coefficients of expansion of respective head holders, carriage and fixing members reduces stresses generated therebetween, and wherein the fixing members comprise screwing means.

5. A magnetic disc apparatus as set forth in claim 4 wherein the axis of said screwing means is approximately in parallel with the plane of a magnetic disc.

6. A magnetic disc apparatus as set forth in claim 4 wherein the axis of said screwing means is approximately perpendicular to the plane of a magnetic disc.

* * * * *